Figure 1:
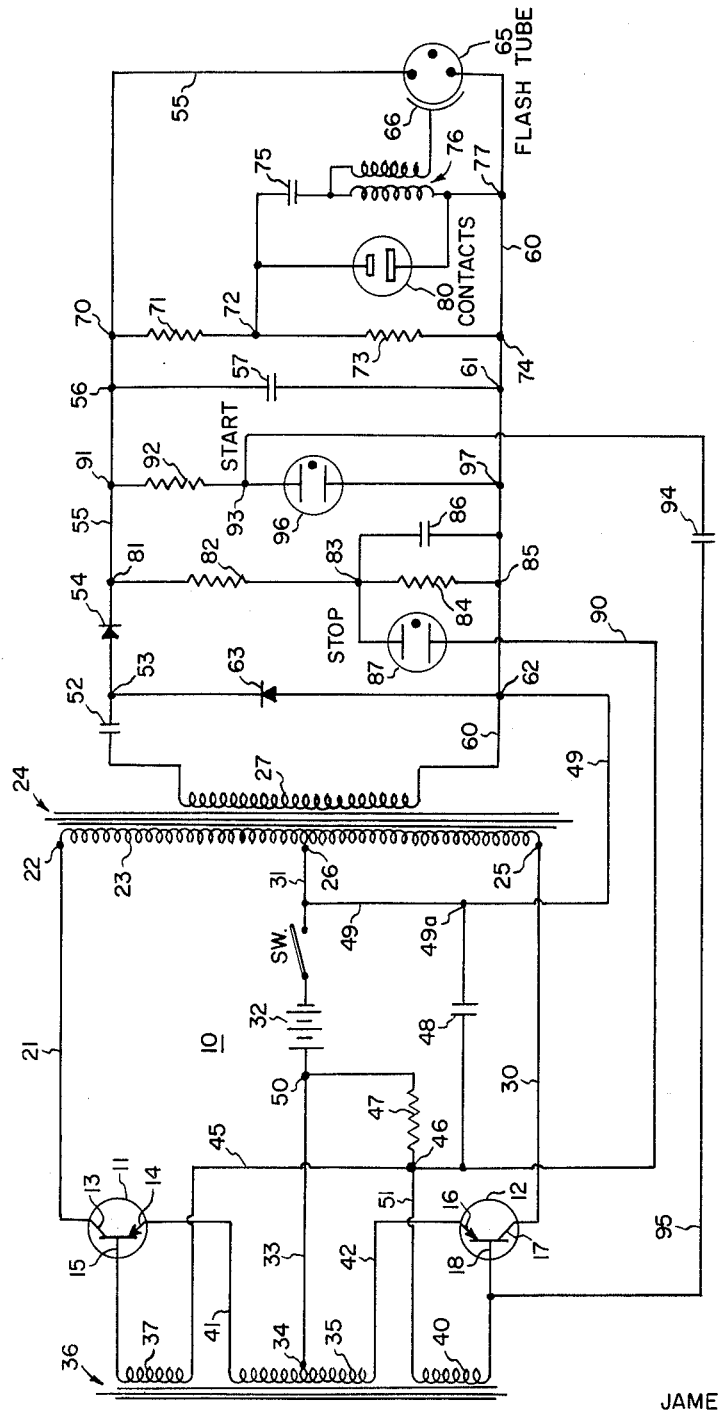

Oct. 19, 1965  J. L. JENSEN  3,213,344
ELECTRICAL HIGH VOLTAGE POWER SUPPLY APPARATUS
Filed Dec. 31, 1958  3 Sheets-Sheet 1

INVENTOR.
JAMES LEE JENSEN
BY Omund R. Dahle
ATTORNEY

INVENTOR.
JAMES LEE JENSEN
BY Osmund R. Dahle
ATTORNEY

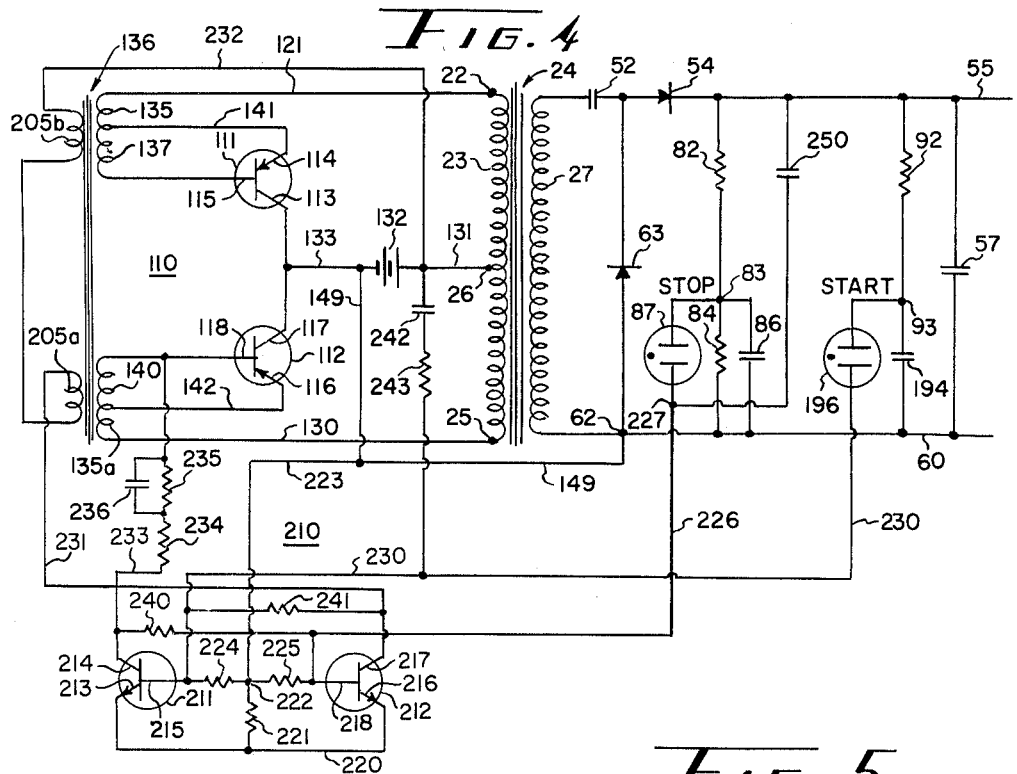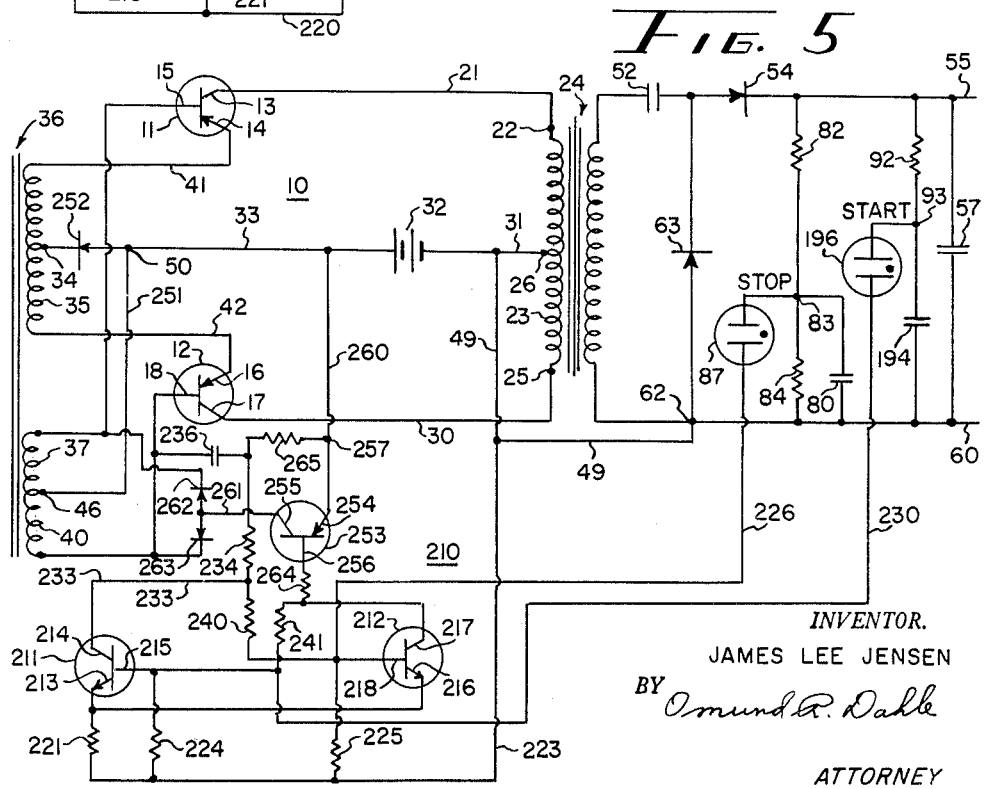

United States Patent Office 3,213,344
Patented Oct. 19, 1965

3,213,344
ELECTRICAL HIGH VOLTAGE POWER
SUPPLY APPARATUS
James Lee Jensen, St. Louis Park, Minn., assignor to
Honeywell Inc., a corporation of Delaware
Filed Dec. 31, 1958, Ser. No. 784,230
10 Claims. (Cl. 320—1)

The present invention is concerned with an improved arrangement in which a capacitor is charged to a high voltage from a direct current low voltage source. The preferred modification of the present invention concerns a photographic flash circuit wherein the capacitor is discharged through the flash tube to produce a brilliant flash of light. The invention is more particularly concerned with an improved battery conserving electronic circuit for efficiently converting the low voltage D.C. potential to a high voltage D.C. potential to charge the high voltage capacitor of the photographic flash unit.

As is known in the art, the electronic type photographic flash unit utilizes a gas filled flash tube which is capable of emitting a brilliant flash of light when a high voltage capacitor is discharged through the flash tube. These flash units are powered either from an A.C. or D.C. source. The A.C. type of flash unit is provided with an extension cord which connects with a source of alternating voltage, such as is available in a residence or a photographic studio. This alternating voltage is stepped up to a high A.C. voltage by means of a step up transformer and is then rectified to charge the capacitor, which capacitor is then selectively discharged through the flash tube to produce the flash of light.

The D.C. type electronic photoflash unit may take one of two forms. The first of these forms involves a heavy, expensive, high voltage battery, for example, a dry cell having a voltage of approximately 450 volts. The high voltage battery charges the capacitor which is then selectively discharged through the flash tube. The second form of D.C. type electronic photographic unit utilizes a plurality of light weight, inexpensive, low voltage batteries commonly called flash light batteries. These cells may be of the type especially adapted for photographic use or may be rechargeable type cells. With this type of unit, a vibrator is provided to convert the low voltage of the battery to a low voltage A.C. or pulsating D.C. The low voltage A.C. is supplied to a step up transformer to produce a high A.C. voltage. This high A.C. voltage is then rectified and the high D.C. voltage charges the capacitor which is connected to the flash tube, the flash tube circuit being adapted to discharge the capacitor through the flash tube to produce a brilliant flash of light.

It will readily be appreciated that it is only the two above described D.C. type flash units which are adapted to be readily used in any situation. This is not true of the A.C. type units because the A.C. type units require an extension cord connecting the unit to a source of alternating voltage, thereby limiting the location in which the A.C. type unit may be utilized.

Prior art D.C. electronic type photographic flash units of the second type, in which the power supply includes a low voltage battery source, a D.C. to A.C. converter, a step up transformer, a rectifier, and a capacitor to be charged, have had the undesirable feature of relatively short battery life. In this connection one of the important factors to consider in photographic flash equipment is the recycle time of the flash unit. This is of particular importance in the electronic type flash units wherein a gas filled flash tube is used and a capacitor is discharged through the tube. In this type of apparatus, the flash tube is capable of very rapid cycling and the limiting feature in its cycling rate is the speed with which the capacitor can be recharged. Rapid recharging of the capacitor results in a heavy current drain from the low voltage cells and requires a relatively heavy duty vibrator to interrupt the D.C. current. The standby power requirements to operate the vibrator are substantial and are continuous whether the capacitor is being charged or is fully charged. In normal photographic use the vibrator must operate until the flash tube is fired, since it is not feasible to turn off the vibrator after the capacitor is charged and prior to the time the flash tube is fired.

In this invention is provided an improved battery saving power supply circuit for an electronic photographic flash unit for converting a low voltage D.C. source to a high voltage D.C. The circuit is particularly designed to shorten the charging time of the load capacitor thereby increasing the recycle rate. In general, the improved circuit comprises a semiconductor oscillator converter circuit for converting the low voltage potential to an A.C. type potential, voltage step up transformer means, and rectifier means for converting the high voltage A.C. to a high voltage D.C. potential. The power supply circuit is designed to provide an output potential which exceeds by a substantial amount the voltage to which the capacitor is to be charged, for example, the power supply may be designed to be capable of providing a 750 volt output and it may be desirable to charge the capacitor to 450 volts. The power supply circuit also includes an oscillator quenching circuit for disabling the oscillator when the capacitor charge reaches the desired magnitude and further circuit means for subsequently restarting the oscillator when a predetermined period of time has elapsed. By this arrangement the power supply operates to rapidly charge the capacitor and is then disabled. By this means a maximum recycle rate is achieved and at the same time provides for consuming a minimum amount of energy from the low voltage batteries so that the battery life is extended.

Although the improved power supply circuit is particularly adapted for use in photographic flash units, the invention is not intended to be limited to use in the photographic field.

Referring now to the drawing, wherein like parts are indicated with like reference numerals throughout the figures:

FIGURES 1–5 are schematic representations of various embodiments of my invention.

Referring now to FIGURE 1, there is shown generally at 10 an oscillator circuit that includes a pair of semiconductor current control devices 11 and 12, here shown as junction type pnp transistors. The device 11 has a collector electrode 13, and emitter electrode 14, and a control electrode 15; likewise a device 12 has an emitter electrode 16, a collector electrode 17 and a control electrode 18. The collector electrode 13 is connected by a conductor 21 to an upper terminal 22 of a primary winding 23 of an output transformer 24. The primary winding 23 also includes a lower terminal 25 and an intermediate tap 26. In addition to the tapped primary winding 23, the transformer 24 includes a step-up secondary winding 27. The collector electrode 17 of transistor 12 is connected by a conductor 30 to the lower transformer terminal 25. The intermediate tap 26 of the winding 23 is connected by a conductor 31 to the negative terminal of a unidirectional source of potential 32, here shown as a battery source such as flashlight cells. The positive terminal of the source 32 is connected by a conductor 33 to an intermediate tap on a winding 35 of a saturable transformer 36. This saturable transformer 36 also includes a pair of windings 37 and 40. The upper extremity of the winding 35 is connected by a conductor 41 to the emitter 14, and the lower extremity of the winding 35 is connected by a conductor 42 to the emitter 16. The positive terminal of the source 32 is thus connected to the emitters 14 and 16 by way of the upper and lower portions of the winding 35, respectively.

The base electrode 15 of transistor 11 is connected through the winding 37, a conductor 45, a junction 46, and a resistor 47 to the positive terminal of the source 32 at a junction 50 on the conductor 33. Likewise the control electrode 18 of transistor 12 is connected through the winding 40 and a conductor 51 to the junction 46, and through the resistor 47 to the positive terminal of the source 32.

The high voltage secondary winding 27 of the transformer 24 has its upper extremity connected through a capacitor 52, a junction 53, a rectifying element 54, here shown as a junction diode, a conductor 55, and a junction 56 to the upper plate of a main storage capacitor 57. This capacitor may have a rating in the order of 400 microfarads and 500 volt rating. The lower extremity of the high voltage secondary winding 27 is connected by means of a conductor 60 and a junction 61 to the lower plate of the capacitor 57. A junction 62 on the conductor 60 is connected to the junction 53 by another rectifying element 63. The capacitor 52, and rectifiers 63 and 54 are connected to form a conventional voltage doubler circuit.

A high voltage photographic flash tube 65 is a gas filled device provided with a pair of main current conducting electrodes, and also with a triggering electrode 66. The upper one of the current conducting electrodes is connected by the conductor 55 and junction 56 to the upper plate of the main storage capacitor 57, and the lower electrode is connected by the conductor 60 and the junction 61 to the lower plate of the capacitor 57. Thus the flash tube is connected in parallel with the storage capacitor 57 and is adapted to be fired by a pulse to the triggering electrode 66 to initiate discharge of the capacitor through the flash tube.

A voltage divider network is also connected across the main storage capacitor 57, and a circuit may be traced from a junction 70 on the conductor 55 through a resistance element 71, a junction 72, and a resistance element 73 to a junction 74 on the conductor 60. A circuit which parallels the resistance element 73 may be traced from the junction 72 through a triggering capacitor 75, and a first portion of a winding of a trigger coil or transformer 76 to a junction 77 on the conductor 60. The other portion of the winding of the triggering coil of transformer 76 is connected to the triggering electrode 66 of the flash tube 65. Also connected in parallel with the resistance element 73 is a pair of normally open triggering contacts 80. These triggering contacts may be connected to or may represent the camera shutter contacts. These components form the triggering circuit for igniting the flash tube and discharging the capacitor 57 through the tube to produce the brilliant flash of light.

A stopping circuit for the oscillator inverter is connected in parallel with the storage capacitor 57. This circuit may be traced from a junction 81 on the conductor 55 and through a voltage divider which includes a resistance element 82, a junction 83 and a resistance element 84 to a junction 85 on the conductor 60. A capacitor 86 is connected in parallel with the resistance element 84. A circuit may be traced from the junction 83 through a bistable reference element 87, such as a neon tube type NE-1, often referred to as a glow tube, and through a conductor 90 to a junction 46, through the capacitor 48 and conductor 49 to the junction 62 on the conductor 60.

A starting circuit of the relaxation oscillator type which has a long time constant with respect to the stopping circuit is also connected in parallel with the main capacitor 57. A current path may be traced from a junction 91 on the conductor 55 through a resistance element 92, a junction 93, a capacitor 94, a conductor 95, through the base-emitter circuit of the transistor 12, through conductor 42, the lower portion of winding 35, conductor 33, source 32, and conductor 49 to the junction 62 on the conductor 60. A bistable reference element 96, which may be of the same type as glow tube 87, is connected between the junction 93 and a junction 97 on the conductor 60. The glow tube 96 is thus in parallel with the capacitor 94 and the emitter-base junction of transistor 12.

Operation of FIGURE 1

Considering now the operation of the circuit of FIGURE 1, the primary source of energy 32 is connected to be converted to an A.C. potential by the oscillator inverter 10. The turns ratio of the output transformer 24 is such that a high A.C. potential appears in the secondary which is rectified to charge the main storage capacitor 57 to a high D.C. voltage.

In order to provide a fast recycling rate of the electronic flash unit, which is limited by the time taken to recharge the main capacitor 57, the D.C. to A.C. to D.C. circuit may be designed to be able to charge the storage capacitor to a much higher voltage than is actually desired on the capacitor. For example, if it is desired to charge the capacitor 57 to 450 volts, the power supply circuit may be designed such that it is capable of charging the capacitor to 700 or more volts. In this way the charging time to reach the desired value of 450 volts is substantially shortened.

Since the oscillator 10 must be stopped when the desired charge appears upon the capacitor 57, a stop circuit comprising the glow tube 87 and the associated circuitry is connected to sense the voltage on the capacitor 57 and upon sufficient voltage charge appearing thereon, the glow tube 87 fires to render the oscillator 10 inoperative. Since the voltage across the capacitor 57 gradually decays due to capacitor leakage and the voltage divider is connected across it, a relatively long time constant pulsating restart circuit comprising the glow tube 96 and capacitor 94 and the associated components is connected to provide a restart pulse to the oscillator 10.

Considering now the operation in greater detail, in the electronic converter circuit 10 a current path may be traced from the positive terminal of the low voltage battery source 32, conductor 33, the upper portion winding 35, conductor 41, emitter to collector of transistor 11, conductor 21, the upper portion of winding 23, to intermediate tap 26, and through the switch contacts to the negative terminal of the source 32. The output current flowing in the upper portion of winding 35 induces a potential in the winding 40 to maintain transistor 12 cutoff and induces a potential in the winding 37 to maintain the transistor 11 fully conductive.

The bias induced in the winding 37 must be designed to be of sufficient magnitude to maintain the transistor in the conductive state. This bias current is proportional to the difference between the current flowing in the upper portion of the winding 35 and the magnetization current requirements of the transformer 36. The transistor 11 continues to conduct until the core of transformer 36 saturates whereupon the magnetization demand of the transformer increases thereby reducing the current available for the base bias current and the transistor is rendered non-conductive. The flux in the core of the transformer 36 tends to collapse whereupon the voltages induced in windings 37 and 40 are reversed such that transistor 11 is held non-conductive and current conduction is initiated in the transistor 12.

With transistor 12 in the conductive state a current path may be traced from the positive terminal of the source 32 through the conductor 33, the lower portion of winding 35, from emitter to collector of transistor 12, through the lower portion of the winding 23 of transformer 24 to the tap 26, and through the switch contacts to the negative terminal of the source 32. The transistor 12 then remains in the conductive state until the core of transformer 36 saturates in the opposite direction whereupon the cycle repeats.

From the above discussion it can be seen that the alternate conduction cycle of transistors 11 and 12 results in an alternating flux being induced in the core of output transformer 24 and thus a high voltage A.C. potential appears in the secondary winding 27. During the half cycle in which the lower terminal of winding 27 is positive a current path may be traced from the lower terminal through the conductor 60, junction 62, rectifier 63, junction 53 and capacitor 52 to the upper terminal of the winding 27, whereupon the capacitor 52 becomes charged. On the succeeding half cycle when the upper terminal of winding 27 is positive, a current path may be traced from the upper terminal of winding 27 through the capacitor 52, rectifier 54, conductor 55 to junction 56, through capacitor 57, and back through conductor 60 to the negative terminal of the winding 27. The capacitor 52 and rectifiers 63 and 54 operate as a conventional voltage doubler circuit, and as oscillation continues the capacitor 57 is charged.

Consideration will now be given to the stop circuit which is connected to sense the potential on the main capacitor 57. This circuit, which is a relaxation type pulse circuit, includes the voltage divider resistors 82 and 84, the capacitor 86 which parallels the resistance 84 and the glow tube 87. The stop circuit is designed such that when the voltage across the main storage capacitor 57 reaches the desired value, the voltage apearing on the glow tube 87 will be sufficient to fire the tube. Current then flows from the junction 83 through the glow tube 87, conductor 90 to junction 46, through the capacitor 48, to junction 49a and through the conductor 49 to the negative conductor 60. The current flow through the glow tube, which continues until the voltage on capacitor 86 is decreased to the extinction point of the glow tube, causes a potential charge on the capacitor 48 which is effective to place a reverse bias on the control electrodes 15 and 18 of the transistors and thereby maintain the transistors in a state of non-conduction. The time constant of this relaxation circuit is relatively short, the capacitor 86 tending to recharge rather rapidly after the glow tube 87 is extinguished and as long as the charge on the main capacitor 57 remains at or above the predetermined stop potential, the relaxation stop circuit will continue to cycle and put out a train of pulses to maintain the oscillator inverter 10 cutoff. As the voltage on the main capacitor 57 decays below the desired potential, the stop circuit will cease pulsing and the reverse base bias will disappear from the transistors 11 and 12.

Since it is desired to maintain the charge on capacitor 57 within relatively narrow limits, for example, 435 to 450 volts, a long time constant pulsing circuit of the relaxation oscillator type is utilized to provide restarting pulses for the oscillator 10. The cycle rate of the start pulsing circuit, which may pulse at 15 second intervals, for example, is determined by circuit requirements including capacitor leakage, the drain on the capacitor due to the voltage divider networks, and the allowable voltage drop from the optimum.

A charging circuit for the capacitor 94 may be traced from the positive conductor 55 through the large resistance 92, the capacitor 94, the conductor 95, through the base-emitter junction of transistor 12 or through the winding 40 and resistance 47, to the positive terminal of the source 32, through source 32 and conductors 31 and 49 to the negative conductor 60. The magnitude of the resistance 92 may be in the order of 50 megohms, thus the charging current of the capacitor 94 is very small and has no effect on the operation of the oscillator 10. It will be noted that the capacitor 94 and the emitter base junction of the transistor 12 is paralleled by the glow tube 96, so that upon the potential charge on capacitor 94 reaching the firing point of the glow tube 96, the glow tube 96 fires and tends to discharge the capacitor 94 through a circuit which includes the emitter base junction of the transistor 12. This current pulse in the transistor 12 renders the transistor conductive and initiates oscillation in the inverter circuit 10. Oscillation then continues in the inverter 10 until the voltage across the storage capacitor 57 increases to the firing point of the stop circuit. Apparatus has thus been shown for rapidly charging the capacitor to a desired voltage and for start-stop control of the oscillator inverter to maintain the voltage on capacitor 57 within narrow limits.

As the main capacitor 57 is charged, a current flows through the divider comprising the resistors 71 and 73 to cause a voltage charge to appear on the triggering capacitor 75. The magnitude of the charging current of capacitor 75 flowing through the first portion of the winding of triggering coil 76 is not of a nature to cause a triggering potential to appear at the triggering electrode 66 of the flash tube 65.

When it is desired to flash the flash tube 65, the camera shutter circuit is completed by completing a circuit between the contacts 80. This circuit shunts the capacitor 75 through the first portion of the triggering coil 76 and a high triggering potential is induced in the second portion of the winding of the triggering coil. Since this portion of the triggering coil is connected to the triggering electrode, the high potential causes the gas particles of the flash tube to ionize and the main capacitor 57 then rapidly discharges through the flash tube 65 to produce the brilliant flash of light.

Figure 2:
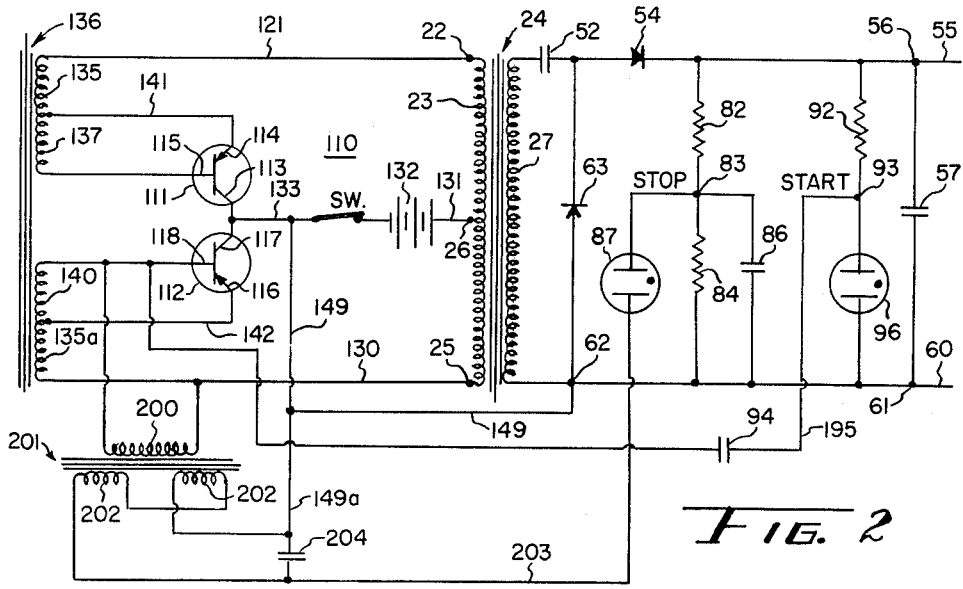

*Figure 2*

The circuit of FIGURE 2 is a modification of that disclosed and described in FIGURE 1. Since this circuit is in many respects similar to FIGURE 1, the like components have been identified with like reference numerals. The high voltage circuit of FIGURE 2 is the same as that described in FIGURE 1 and will not be discussed further. The circuit of FIGURE 2 discloses a low voltage D.C. source 132 which is reversed in polarity with respect to FIGURE 1. The positive terminal of the source 132 is connected by a conductor 131 to the mid tap 26 of the winding 23 of transformer 24. The upper extremity 22 of the winding 23 is connected by a conductor 121 to the upper extremity of a tapped winding 135 of the saturable coil or transformer 136. The lower extremity of winding 135 is connected by a conductor 141 to an emitter electrode 114 of a semiconductor current controlling device 111.

The semiconductor device 111 also includes a collector electrode 113 and a control electrode 115. A similar semiconductor device 112 has an emitter electrode 116, a collector electrode 117 and a control electrode 118. The collector electrodes 113 and 117 are connected together and are connected by a conductor 133 and a switch to the negative terminal of the source 132. The control electrode 115 is connected through a further winding 137 on a saturable core 136 to the conductor 141. The lower terminal 25 on the winding 23 is connected by a conductor 130 to the lower extremity of the winding 135a on the saturable transformer 136; the upper extremity of the winding being connected by a conductor 142 to the emitter electrode 116 of transistor 112. The control electrode 118 is connected by a winding 140 of the saturable transformer 136 to the conductor 142. The windings 135, 137, 140 and 135a on the transformer 136 are all inductively coupled one to another.

A conductor 195 is connected from the junction 93 adjacent glow tube 96 to the control electrode 118 of the semiconductor device 112 through capacitor 94. A conductor 149 is connected from the junction 62 on the conductor 60 to the conductor 133. A winding 200 of a saturable reactor 201 is connected in shunt relation to the windings 135a and 140 of the feedback transformer 136. The saturable reactor 201 also has a pair of primary windings 202 which are arranged so that no A.C. voltage is induced into the primary windings from the oscillator 110. One terminal of the winding 202 is connected by conductors 149a and 149 to the conductor 60 at junction 62. The other terminal of winding 202 is connected through a conductor 203 and the glow tube 87 to the junction 83. A capacitor 204 is connected in parallel with the winding 202.

In considering the operation of FIGURE 2, it will be noted that the high voltage circuit is the same as that disclosed for FIGURE 1, and it is to be understood that the load storage capacitor 57 is adapted to be connected to the same type electronic flash tube circuit as disclosed in FIGURE 1, and reference may be had to the discussion of operation of FIGURE 1 for the high voltage portion of the circuit. The oscillator converter 110 of FIGURE 2 operates in substantially the same manner as the oscillator 10 of FIGURE 1, except that the circuit connections are slightly modified. If it is assumed that the oscillator is operating and that the transistor 111 is conductive, a current path may be traced from the positive terminal of the source 132 through the conductor 131, the upper portion of winding 23, conductor 121, winding 135 of transformer 136, conductor 141, from emitter to collector of transistor 111, and through the conductor 133 and the switch to the negative terminal of the source 132. The load current flowing in the winding 135 induces a potential in the winding 140 to maintain the transistor 112 cutoff, and induces a potential in the winding 137 to maintain the transistor 111 fully conductive. Upon saturation of the core of transformer 136, the induced voltages in the windings are reversed and transistor 112 is rendered conductive whereupon a current path can be traced through the lower portion of winding 23, winding 135a and transistor 112.

In considering the action of the oscillator stopping circuit, it will be noted that the winding 200 of the saturable reactor 201 is connected to shunt the winding 135a and 140 and thus to shunt the input to the transistor 112. Under normal oscillating conditions the impedance of winding 200 is very high and exerts substantially no impedance shunting effect. As the voltage on the storage capacitor 57 reaches the limiting value so that glow tube 87 fires, a current path may be traced from the junction 83 through the glow tube 87, conductor 203, the windings 202 of reactor 201 and through conductors 149a and 149 to the negative conductor 60. The current flowing in this circuit has the effect of saturating the core of reactor 201 whereupon the impedance presented by the winding 200 becomes very low to shunt the input to the oscillator 110 whereupon oscillation ceases. The capacitor 204 tends to integrate the current pulse from the stop circuit. When the current ceases to flow in the winding 202 and the flux in the reactor core returns to its residual valve, and the impedance presented by the winding 200 is substantially increased so that it no longer prevents the oscillator from operating. Subsequently, when the glow tube 96 fires to provide the start pulse through the capacitor 94 to the control electrode 118 of transistor 112, oscillation is again initiated in the oscillator 110.

Figure 3:
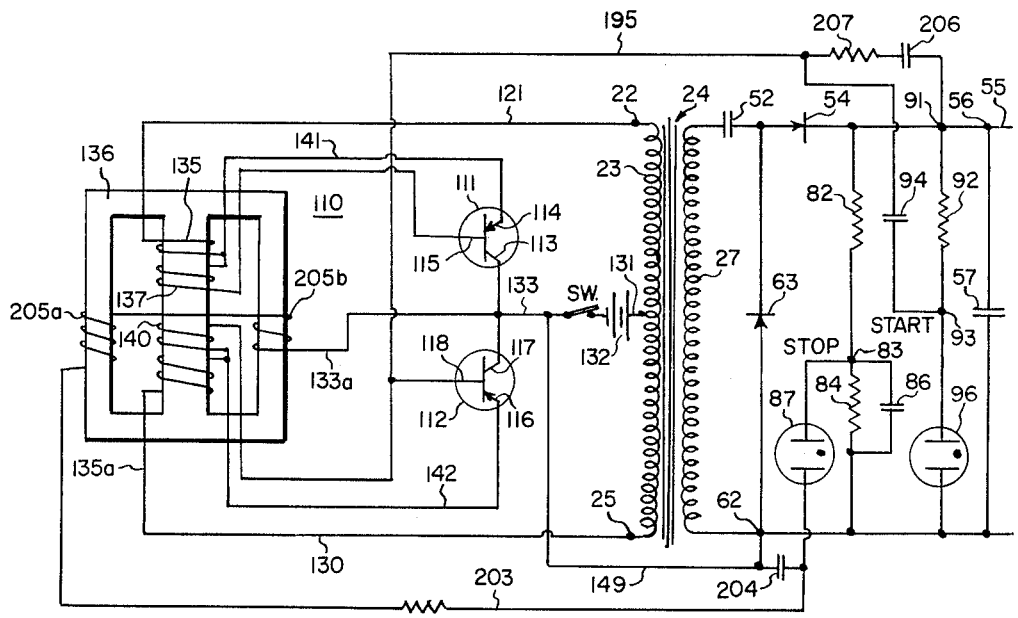

*Figure 3*

In the circuit of FIGURE 3, the saturable feedback transformer 136 is disclosed as a three-legged core having the windings 135, 137, 140, and 135a located on the central leg, and having a pair of windings 205a and 205b located, respectively, on the outer legs. The windings 205a and 205b are connected in series in such a manner that oscillation operation does not cause an A.C. potential to appear at the two external connections of the series connected windings. The windings 205a and 205b are utilized in the oscillator stop circuit and a current path may be traced from the terminal 83 through the glow tube 87, the conductor 203 and a current limiting resistor, the windings 205a, 205b, conductors 133a, 133 and 149, to the junction 62 on the negative conductor 60. The capacitor 204 is connected between the conductor 203 and the conductor 60. A capacitor 206 and a series connected resistor 207 are connected between the junction 91 on the conductor 55 and the conductor 195 which connects to the control electrode 118 of transistor 112.

In the circuit of FIGURE 3 it will be noted that the oscillator stopping circuit comprising the glow tube 87 and the associated components, when operating, is effective to cause a sufficient current to flow in the windings 205a and 205b to saturate the core legs upon which the windings are wound and thereby stopping the oscillator. This action is similar in nature to the stopping circuit described in FIGURE 2 except that the separate reactor is replaced by additional windings on the feedback transformer.

The restarting circuit comprising glow tube 96 and capacitor 94 and the associated components is connected to the control electrode 118 and operates as described previously. In addition, the capacitor 206 is provided for the purpose of providing a starting signal to the oscillator 110 when the flash tube is fired discharging the storage capacitor 57. This auxiliary starting circuit may be necessary if the main oscillator 110 is not oscillating at the time the flash tube is fired. Although capacitive coupling is shown, inductive coupling may also be utilized sensing the flash tube current.

*Figure 4*

The circuit of FIGURE 4 discloses an oscillator 110 similar to the oscillator of FIGURE 2, and in addition discloses a bistable switching circuit 210 which is controlled by pulses from the stop and start relaxation type pulsing circuits to control the operation of the oscillator converter 110. The bistable circuit comprises a pair of semiconductor amplifying devices 211 and 212 here disclosed as NPN junction transistors. Transistor 211 has an emitter electrode 213, a collector electrode 214 and a control electrode 215, likewise the transistor 212 includes an emitter electrode 216, a collector electrode 217 and a control electrode 218. The emitter electrodes 213 and 216 are connected by a conductor 220, a resistor 221, a junction 222, and a conductor 223, to the junction 62 on the conductor 60. The control electrodes 215 and 218 are connected by resistors 224 and 225, respectively, to the junction 222. The control electrode 218 is also connected by a conductor 226 and a junction 227 to the glow tube 87. The control electrode 215 of transistor 211 is connected through a conductor 230 and a glow tube 196 to the junction 93. The junction 93 is connected to the conductor 55 by the resistance element 92 and to the conductor 60 by a capacitor 194.

The collector electrode 217 is connected by a conductor 231 and through the auxiliary windings 205a and 205b on the core 136 and then through a conductor 232 to the positive terminal of the source 132. The collector electrode 214 is connected by a conductor 233, resistors 234 and 235 to the control electrode 118 of transistor 112. A capacitor 236 parallels the resistor 235. The collector electrodes of each of the transistors of the bistable circuit are cross connected to the control electrode of the other; a resistor 240 connecting the collector 214 to the control electrode 218 and a resistance element 241 connecting the collector 217 to the control electrode 215. The positive terminal of source 132 is also connected by a capacitor 242, a resistance 243 and the conductor 230 to the control electrode 215 of transistor 211.

In considering the operation of the circuit of FIGURE 4 it will be understood that the transistors 211 and 212 form a bistable circuit which may be pulsed to either one of two stable operating conditions. With initial energization of the circuit, a current charging pulse flowing through a capacitor 242 causes the transistor 211 to be rendered conductive. This capacitor charging current path may be traced from the positive terminal of source 132 through the capacitor 242, the resistance 243, the conductor 230, from control electrode to emitter electrode of transistor 211, through conductor 220 and resistor 221, and through conductors 223 and 149 to the negative terminal of source 132. As the resistor 211 is driven to a conductive state, a current path is established which initiates conduction in the oscillator 110. This current path may be traced from the positive terminal of the source 132 through the lower portion of winding 23, conductor 130, winding 135a, conductor 142, from emitter to control electrode of transistor 112, through the resistors 235 and 234, through transistor 211 from collector to emitter, and then through resistor 221 and conductors 223 and 149 to the negative terminal of the source 132. The transistor 112 is thus biased on and the oscillator starts. During this period the transistor 212 is maintained non-conductive.

When the voltage on the storage capacitor 57 reaches the desired level, the glow tube 87 fires, as previously disclosed, providing a current pulse to initiate conduction in the transistor 212 and reverse the state of operation of the bistable switching circuit. This current path may be traced from the junction 83, through the glow tube 87, conductor 226, from control electrode to emitter electrode of transistor 212, through conductor 220 and resistor 221, and through conductors 223 and 149 to the conductor 60 at junction 62. With transistor 212 being rendered conductive, the feedback through resistor 221 is effective to cutoff transistor 211. The collector current of transistor 212 flows through the windings 205a and 205b to saturate the feedback transformer 136, thereby stopping the oscillator. This transformer arrangement may be of the type disclosed in the circuit of FIGURE 3. This circuit may be traced from the positive terminal of the source 132 through the conductor 232, windings 205b and 205a, conductor 231, from collector to emitter of transistor 212, through resistor 221, and through conductors 223 and 149 to the negative terminal of the source 132. Since the transistor 212 continues conducting the oscillator 110 cannot restart.

Periodically the relaxation pulsing circuit, formed by resistor 92, capacitor 194 and the glow tube 96, fires turning on the transistor 211 thereby shutting off the transistor 212 and reinitiating conduction in the oscillator 110. This circuit may be traced from the junction 93 through the glow tube 196, conductor 230, through transistor 211 from control electrode to emitter electrode, through resistor 221 and the conductors 223 and 149 to the junction 62 on conductor 60. A capacitor 250 connected between the positive conductor 55 and the junction 227 on conductor 226, is effective upon the firing of the flash tube to turn off the transistor 212 and thus reinitiate conduction in the transistor 211 and in the oscillator 110 to recharge the storage capacitor 57.

*Figure 5*

The circuit of FIGURE 5 is a modification of FIGURES 1 and 4 and discloses an oscillator converter 10 which is basically the same as described in FIGURE 1 and also discloses a bistable switching circuit which is basically like that disclosed and described in FIGURE 4. In the oscillator circuit, the common connection 46, which is common to one extremity of windings 37 and 40 of saturating feedback transformer 46, is directly connected by a conductor 251 to the junction 50 on the conductor 33. A diode 252 or other impedance is connected between the conductor 33 and the mid tap 34 of the winding 35. The control electrode 18 of the transistor 12 is connected through the capacitor 236 and the resistor 234 to the collector electrode of the bistable circuit transistor 211. A bias shunting transistor 253, which has an emitter electrode 254, a collector electrode 255 and a control electrode 256, has its emitter electrode 254 connected by a junction 257 and a conductor 260 to the positive terminal of source 32. The collector electrode 255 is connected through a conductor 261 and a rectifying diode 262 to the upper terminal of the bias winding 37 of feedback transformer 36. The collector 255 is also connected through the conductor 261 and a rectifying diode 263 to the lower extremity of bias winding 40. The control electrode 256 is connected by a resistor 264 to the collector electrode 217 of the transistor 212. A resistor 265 is connected between the junction 257 on the conductor 260 and the junction between capacitor 236 and resistor 234.

In considering the operation of the circuit of FIGURE 5 it will be noted that the bistable circuit 210 can be operated to one or the other of two stable operating states by the two relaxation type pulsing circuits. The state of operation of the bistable circuit 210 controls the operation of the oscillator converter 10. For purposes of explanation let it be assumed that transistor 211 is conducting allowing the oscillator 10 to function normally thereby charging the storage capacitor 57.

Upon the desired voltage being reached on the capacitor 57, the glow tube 87 fires providing a switching pulse to the bistable circuit 210 and rendering the transistor 212 conductive. This circuit may be traced from the junction 83 through the glow tube 87, conductor 226, from control electrode 218 to emitter of transistor 212, through the emitter resistor 221, and through the conductors 223 and 49 to the junction 62 on the conductor 60. Upon the transistor 212 being rendered conductive the transistor 253 is caused to commence conducting. This current path may be traced from the positive terminal of source 32 through the conductors 33 and 260, junction 257, from emitter to control electrode 256 of the transistor 253, through resistor 264, from collector to emitter of transistor 212, through resistor 221 and through conductors 223 and 49 to the negative terminal of source 32.

In operation, the transistor 253 operates as a shunt on the bias drive windings 37 and 40. It will be noted that the emitter electrode 254 is directly connected by the conductors 260, 33 and 251 to the common terminal of windings 37 and 40, and that the collector electrode 255 is connected through the rectifying diodes 262 and 263, respectively, to the other extremities of windings 37 and 40. Thus it can be seen that when the transistor 253 is rendered conductive, the output electrodes of the transistor act as a low impedance shunt across the windings 37 and 40 to short out the induced voltage whereupon oscillation ceases.

After a period of time the start circuit fires and the current flowing through the glow tube 196 and the conductor 230 provides a switching pulse to the bistable circuit 210 to reinitiate conduction in the transistor 211. The transistors 212 and 253 are thereby rendered cutoff. The reinitiation of conduction in transistor 211 causes a capacitor charging pulse to flow through the input electrodes of transistor 12 to charge the capacitor 236, this current pulse being effective to aid restarting of the oscillator 10.

Many changes and modifications of this invention will undoubtedly occur to those who are skilled in the art, and I therefore wish it to be understood that I intend to be limited by the scope of the appended claims and not by the embodiments of my invention which are disclosed herein for the purpose of illustration.

I claim:

1. Battery conserving power supply apparatus of the type converting a low voltage battery source to a high potential for charging an energy storage load means comprising: a low voltage unidirectional energy source; high voltage energy storage load means; oscillator inverter means comprising semiconductor amplifier means energized by said low voltage source connected to convert said low voltage source to a high voltage, said oscillator inverter means being designed to be capable of charging said high voltage load means rapidly to a state of charge in excess of a maximum desired state from said low voltage source; oscillator inverter disabling means including a rapid cycling pulsing circuit, said means having an input circuit connected to said load means and responsive to the state of charge on said load means to provide a pulsing output signal upon the desired state of charge being sensed, said pulsing output signal being applied to said oscillator inverter to temporarily disable said oscillator inverter; and oscillator inverter restarting means including a second pulsing circuit, which has a slow repetition rate with respect to the rapid cycling pulsing circuit, said oscillator inverter restarting means being connected to said semiconductor amplifier means to periodically apply a current pulse thereto to restart said oscillator inverter.

2. Battery conserving power supply apparatus for an electronic photographic flash unit of the type converting a low voltage battery source to a high potential for charging a high voltage storage means comprising: a low voltage source of unidirectional voltage; output means having input and output terminals; high voltage storage means; first circuit means connecting said output terminals to said storage means in energizing relation thereto; semiconductor amplifying means; second circuit means including saturable impedance means connecting said source of voltage, the input terminals of said output means and said semiconductor amplifying means in an oscillating type circuit for producing a pulsating type current at said output means, said oscillating type circuit and said output means being designed to tend to charge said high voltage storage means rapidly to a voltage in excess of the maximum desired voltage from said low voltage source; voltage responsive circuit means including a rapid cycling pulsing circuit, said last named means having an input circuit connected to sense the voltage on said high voltage storage means and, upon the desired voltage being sensed, providing a pulsating output signal to said second circuit means to disable said oscillating type circuit; oscillator restarting means including a second pulsing circuit which has a slow repetition rate with respect to the rapid cycling pulsing circuit, said oscillator restarting means being connected to said semiconductor amplifying means to periodically apply a current pulse thereto to restart said oscillating type circuit, and circuit means connecting said storage means to photographic flash tube means, said last named circuit means being adapted to selectively ignite said flash tube means and discharge said storage means through said tube.

3. Battery conserving power supply apparatus for an electronic photographic flash unit of the type converting a low voltage battery source to a high potential for charging a high voltage storage means comprising: a low voltage source of unidirectional voltage; voltage step up transformer means having input and output terminals; high voltage storage means; means including rectifier means connecting said output terminals to said storage means in energizing relation thereto; semiconductor switching means; first circuit means including saturable impedance means connecting said source of energy, the input terminals of said transformer means and said semiconductor switching means in an oscillating type circuit for producing a pulsating type current at said transformer means, said oscillating type circuit and said transformer means being designed to be capable of charging said high voltage storage means rapidly to a voltage in excess of a desired voltage; voltage responsive circuit means, including a first pulsing circuit, having an input circuit connected to sense the voltage on said high voltage storage means and upon the desired voltage being sensed providing a pulsating output signal to said first circuit means to disable said oscillating type circuit; oscillator restarting means, including a second pulsing circuit which has a slow repetition rate with respect to said first pulsing circuit, oscillator restarting means being connected to said semiconductor switching means to periodically apply a current pulse thereto to restart said oscillating type circuit; and circuit means connecting said storage means to photographic flash tube means, said last named circuit means being adapted to selectively ignite said flash tube and discharge said storage means through said tube.

4. Battery conserving power supply apparatus for an electronic photographic flash unit of the type converting a low voltage battery source to a high voltage for charging a high voltage storage means comprising: a low voltage battery source; voltage step-up transformer means having input and output terminals; high voltage storage means; first circuit means connecting said transformer output terminals to said storage means in energizing relation thereto; semiconductor amplifying means; second circuit means including saturable impedance means connecting said battery source, the transformer means input terminals and said semiconductor amplifying means in an oscillating type circuit for producing a pulsating type current at said transformer means, said oscillating type circuit and said transformer means being designed to tend to charge said high voltage storage means rapidly to a voltage in excess of a maximum desired voltage; voltage responsive circuit means including a rapid cycling pulsing circuit, said last named means having an input circuit connected to sense the voltage on said high voltage storage means and, upon the desired voltage being sensed, providing a pulsating output signal to said second circuit means to disable said oscillating type circuit as long as the sensed voltage is at the desired voltage; and oscillator restarting means, including a second pulsing circuit, which has a slow current pulse repetition rate with respect to said rapid cycling pulsing circuit, said oscillator restarting means being energized by the high voltage storage means and also connected to said semiconductor amplifying means to periodically apply a current pulse thereto to restart said oscillating type circuit, so that said oscillating type circuit is stopped when the storage means is charged to the desired voltage and is periodically restarted to maintain the storage means charge at the desired value whereby a minimum of power is drawn from the battery when the storage means is charged and battery power is thereby conserved.

5. Battery conserving power supply apparatus of the type for converting a low voltage battery source to a high voltage for charging storage means to a predetermined high voltage, comprising: normally operative semiconductor oscillator means energized from the low voltage source comprising at least one semiconductor amplifying device having input and output terminals, said input terminals having a regenerative feedback loop connected in circuit therewith; means including rectifier means connecting said output terminal to the storage means in charging relation thereto; bistable semiconductor switching means connected to said feedback loop having a first normal condition of operation in which said semiconductor oscillator means is permitted to operate, and being operable by a suitable signal to a second normal condition in which second condition said regenerative feedback loop is effectively shunted to render said semiconductor oscillator means inoperative; voltage responsive signal producing means adapted to produce an output current signal upon sensing the predetermined voltage, said voltage responsive means being connected to said storage means to sense the voltage charge thereon, and having an output circuit connected to said bistable semiconductor means, the output signal from said voltage responsive means being effective to switch said bistable semiconductor means from said first normal condition to said second normal condition, so that upon said storage means being charged to said predetermined voltage said semiconductor oscillator means is rendered inoperative; and pulsing circuit means for subsequently restarting said oscillator means, effective at spaced intervals to produce an output current pulse to said bistable means to switch said bistable means to said first operating condition and thereby reinitiate oscillation in said semiconductor oscillator means.

6. Battery conserving power supply apparatus of the type for converting a low voltage battery source to a high voltage for charging storage means to a predetermined high voltage, comprising: normally operative semiconductor oscillator means energized from the low voltage source at least one semiconductor amplifying device having input and output terminals, said input terminals having a regenerative feedback loop including a feedback transformer connected in circuit therewith; means including rectifier means connecting said output terminals to said storage means in charging relation thereto; bistable semiconductor switching means connected to said feedback transformer, said bistable means having a first normal condition of operation and being operable by a suitable signal to a second normal condition in which second condition said feedback transformer is effectively shunted to render said semiconductor oscillator means inoperative; voltage responsive signal producing means adapted to produce an output current signal upon sensing the predetermined voltage, said voltage responsive means being connected to said storage means to sense the voltage charge thereon, and having an output circuit connected in controlling relation to said bistable means, the output signal from said voltage responsive means being effective to switch said bistable means from said first condition to said second condition, so that upon said storage means being charged to said predetermined voltage said semiconductor oscillator means is rendered inoperative; and pulsing circuit means for subsequently restarting said oscillator means effective at spaced reocurring intervals to produce output current pulses to said bistable circuit to switch said circuit to said first condition and thereby reinitiate oscillation in said semiconductor oscillator means.

7. Battery conservng power supply apparatus of the type for converting a low voltage battery source to a high voltage for charging storage means to a high voltage, comprising: normally operative semiconductor oscillator means energized from the low voltage source comprising at least one semiconductor current controlling device having input and output terminals, said input terminals having a regenerative feedback loop including a feedback transformer connected in circuit therewith; output means including rectifier means for connecting said output terminals to said storage means in charging relation thereto; auxiliary winding on said feedback transformer means, said auxiliary winding means being energizable by a suitable signal to render said feedback transformer ineffective, whereupon said semiconductor oscillator means is rendered inoperative; bistable semiconductor switching means connected to said auxiliary winding means, said bistable means having a first condition of operation and being operable to a second condition, in which second condition a current signal is caused to flow to said auxiliary winding means to saturate said feedback transformer and render said oscillator means inoperative; voltage responsive signal producing means adapted to produce an output signal upon sensing a predetermined voltage, said voltage responsive means being connected to said storage means to sense the potential charge thereon, the output circuit of said voltage responsive means being connected in controlling relation to said bistable means, the output signal from said voltage responsive means being effective to switch said bistable means from said first condition to said second condition, so that upon the storage means being charged to said predetermined voltage said semiconductor oscillator means is rendered inoperative; and pulsing circuit means, for subsequently restarting said oscillator means, effective at spaced intervals to produce output signal pulses to said bistable means to cause said bistable means to revert to the first condition and thereby reinitiate oscillation in said semiconductor oscillator means.

8. An electrical circuit comprising: a storage capacitor; a power transistor vibrator and voltage multiplier network for charging said capacitor from a source of D.C. potential; a control transistor connected between two terminals of said power transistor and adapted, when conductive, to short-circuit said terminals; a glow lamp adapted to conduct upon application thereto of a predetermined voltage; and circuit connections for biasing said control transistor to conduction in response to a predetermined voltage on said capacitor.

9. An electrical circuit comprising: transformer means having two primary windings and a secondary winding; a power transistor triode having an emitter, base, and collector electrode connected in circuit to form a power supply loop including, in series, one of said primary windings and a feedback loop including, in series, the other of said primary windings; a storage capacitor and a diode connected in series across said secondary winding; a control transistor connected to short-circuit said feedback loop when biased to conduction; and a glow lamp coupled between said control transistor and said storage capacitor and adapted to conduct, upon the attainment of a predetermined voltage across said storage capacitor, and apply to said control transistor a bias potential rendering said control transistor conductive.

10. An electrical circuit comprising: a transformer having two primary windings and a secondary winding; a power transistor triode having an emitter, base, and collector electrode connected in circuit to form a power supply loop including, in series, one of said primary windings and a feedback loop including, in series, the other of said primary windings; a storage capacitor and a diode connected in series across said secondary winding; a control transistor connected to short-circuit said feedback loop when biased to conduction; and a glow lamp coupled between said control transistor and said storage capacitor and adapted to conduct, upon the attainment of a predetermined voltage across said storage capacitor, and apply to said control transistor a bias potential rendering said control transistor conductive.

References Cited by the Examiner

UNITED STATES PATENTS

| | | | |
|---|---|---|---|
| 2,748,274 | 5/56 | Pearlman | 321—2 X |
| 2,791,739 | 5/57 | Light | 321—2 |
| 2,852,730 | 9/58 | Magnuski | 321—2 |
| 2,854,615 | 9/58 | Light | 321—2 |
| 2,873,409 | 2/59 | Most | 320—1 X |
| 2,877,385 | 9/59 | Rock | 320—1 X |
| 2,901,671 | 8/59 | Most | 321—1 X |
| 2,944,191 | 7/60 | Kapteyn | 315—200.1 |
| 3,004,226 | 10/61 | Jensen | 331—113.1 |
| 3,127,551 | 3/64 | Lingle | 320—1 |

IRVING L. SRAGOW, *Primary Examiner.*

MILTON C. HIRSHFIELD, *Examiner.*